United States Patent [19]

Dzioba

[11] Patent Number: 5,052,509
[45] Date of Patent: Oct. 1, 1991

[54] ANTI-THEFT STEERING SHAFT LOCK

[75] Inventor: Donald L. Dzioba, Midland, Mich.

[73] Assignee: General Motors Corporation, Detroit, Mich.

[21] Appl. No.: 555,221

[22] Filed: Jul. 20, 1990

[51] Int. Cl.$^5$ .............................................. B60R 25/06
[52] U.S. Cl. ..................................... 180/287; 70/245; 74/477
[58] Field of Search ................... 180/287; 70/248, 201, 70/245, 255, 252, 247; 74/475, 477

[56] References Cited

U.S. PATENT DOCUMENTS

| | | | |
|---|---|---|---|
| 1,827,732 | 10/1931 | Conlan | 180/287 |
| 4,249,404 | 2/1981 | Kimberlin | 180/287 |
| 4,258,560 | 3/1981 | Jessop | 180/287 |
| 4,270,624 | 6/1981 | Jessop | 180/287 |
| 4,326,432 | 4/1982 | Miller | 180/287 |
| 4,821,605 | 4/1989 | Dzioba | 70/248 |
| 4,934,209 | 6/1990 | Dewitt et al. | 70/248 |

Primary Examiner—Richard A. Bertsch
Attorney, Agent, or Firm—Saul Schwartz

[57] ABSTRACT

An anti-theft steering shaft lock on an automobile steering column includes a keeper rotatable as a unit with a steering shaft of the steering column, a dead bolt slidable into and out of a slot in the keeper to immobilize the steering shaft, a transmission shift lever rotatable about a transverse axis of the steering column, a connecting rod between the shift lever and the dead bolt for withdrawing the dead bolt from the keeper slot when the shift lever is rotated from a PARK position to an operating range position, and a blocker on the steering column connected to an ignition lock on the steering column operative to prevent withdrawal of the dead bolt from the keeper when the ignition is locked. The mechanical advantage attributable to the length of the shift lever affords relatively effortless withdrawal of the dead bolt from the keeper against residual torque induced friction between the dead bolt and the keeper slot.

6 Claims, 2 Drawing Sheets

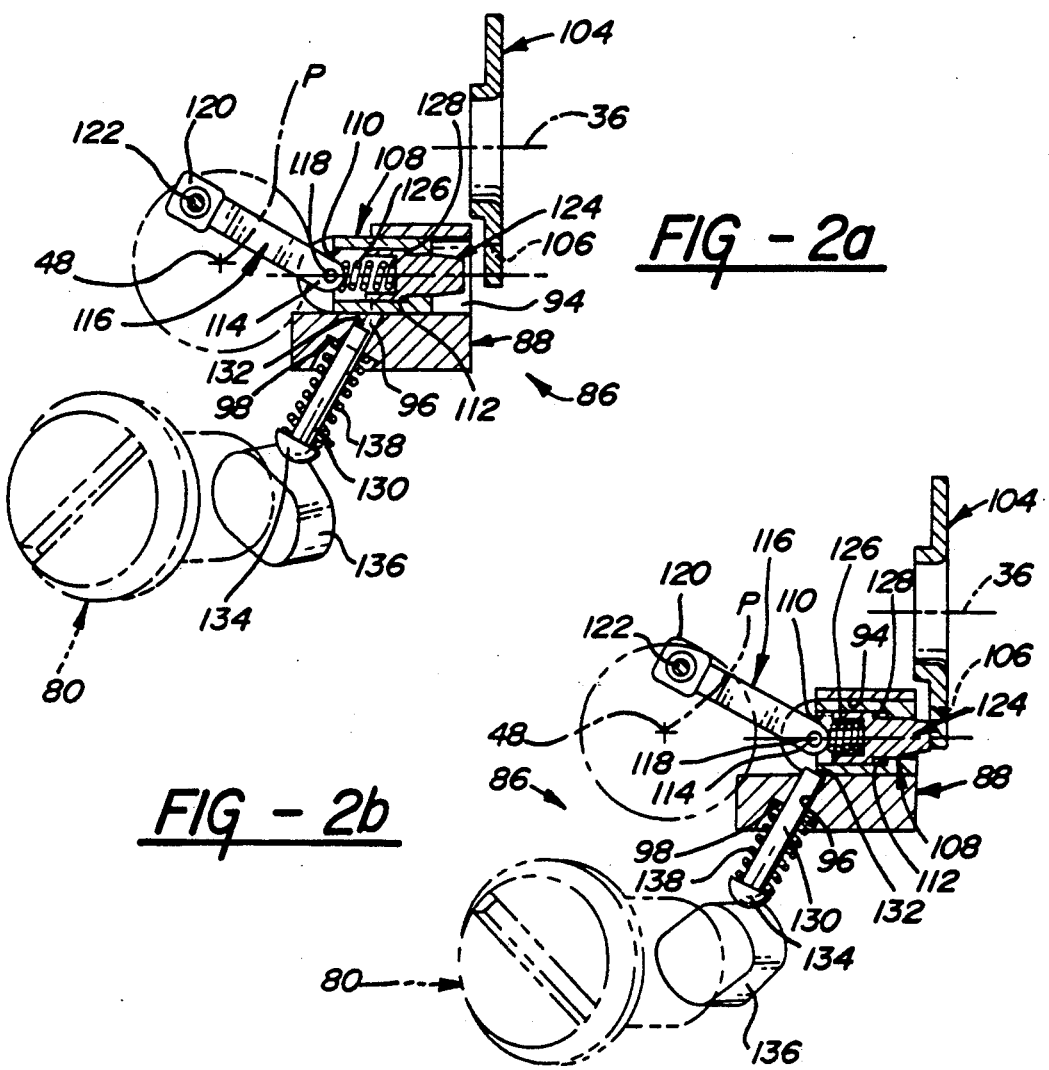
*FIG - 2a*
*FIG - 2b*
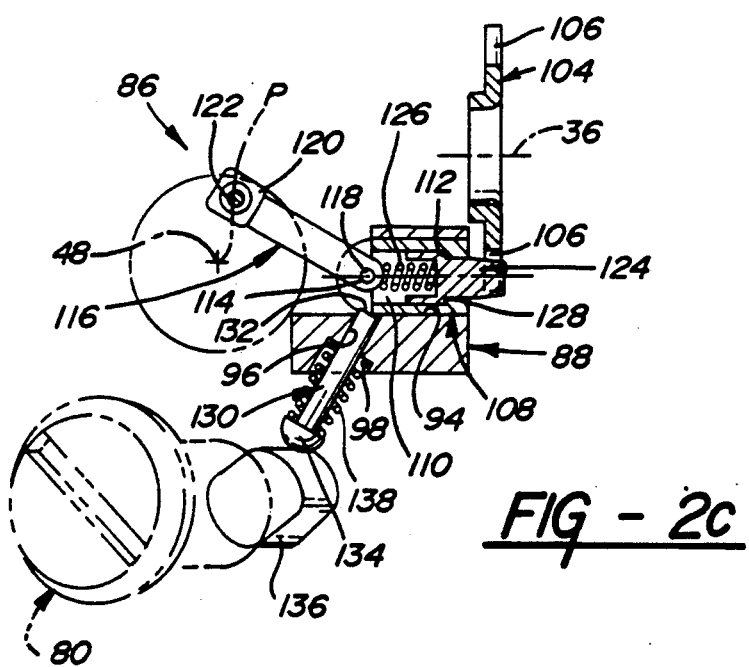
*FIG - 2c*

ANTI-THEFT STEERING SHAFT LOCK

FIELD OF THE INVENTION

This invention relates to anti-theft steering shaft locks on automobile steering columns

BACKGROUND OF THE INVENTION

Anti-theft steering shaft locks on automobile steering columns typically include a shiftable dead bolt on the steering column and a slotted keeper rotatable with the steering shaft The force for withdrawing the dead bolt from the keeper is usually derived from the ignition key which a driver turns to start the engine of the automobile. Sometimes, friction between the dead bolt and the keeper resulting from residual torque on the steering shaft may inhibit withdrawal of the dead bolt and, consequently, render the ignition key difficult to turn. Such residual torque may, for example, result from parking and locking the automobile with the front wheels against a curb. In an anti-theft steering shaft lock according to this invention, the force for withdrawal of the dead bolt from the keeper is derived from a source independent of the ignition key and less sensitive than the ignition key to friction between the dead bolt and the keeper.

SUMMARY OF THE INVENTION

This invention is a new and improved anti-theft steering shaft lock on an automobile steering column The anti-theft steering shaft lock according to this invention includes a slotted keeper rotatable with a steering shaft of the steering column, a dead bolt supported in a guide on the steering column for movement between locked and unlocked positions relative to the keeper, a direct drive connection between the dead bolt and a shift lever connected to a transmission of the automobile for withdrawing the dead bolt from its locked position in the keeper concurrently with movement of the shift lever from the position it assumes when the vehicle is parked and locked, and a blocker on the steering column movable by an ignition key into and out of a blocking position behind the dead bolt when the dead bolt is in its locked position. The force for withdrawing the dead bolt from its locked position is derived from the shift lever which, because of the mechanical advantage attributable to its length, is relatively insensitive to friction between the dead bolt and the keeper. In a preferred embodiment of the anti-theft steering shaft lock according to this invention, the shift lever and the ignition lock are both mounted on the steering column near the steering shaft lock.

BRIEF DESCRIPTION OF THE DRAWINGS

FIGS. 2a-2c are fragmentary elevational views taken generally along the plane indicated by lines 2—2 in FIG. 1 and illustrating operation of the anti-theft steering shaft lock according to this invention.

DESCRIPTION OF A PREFERRED EMBODIMENT

Figure 1:
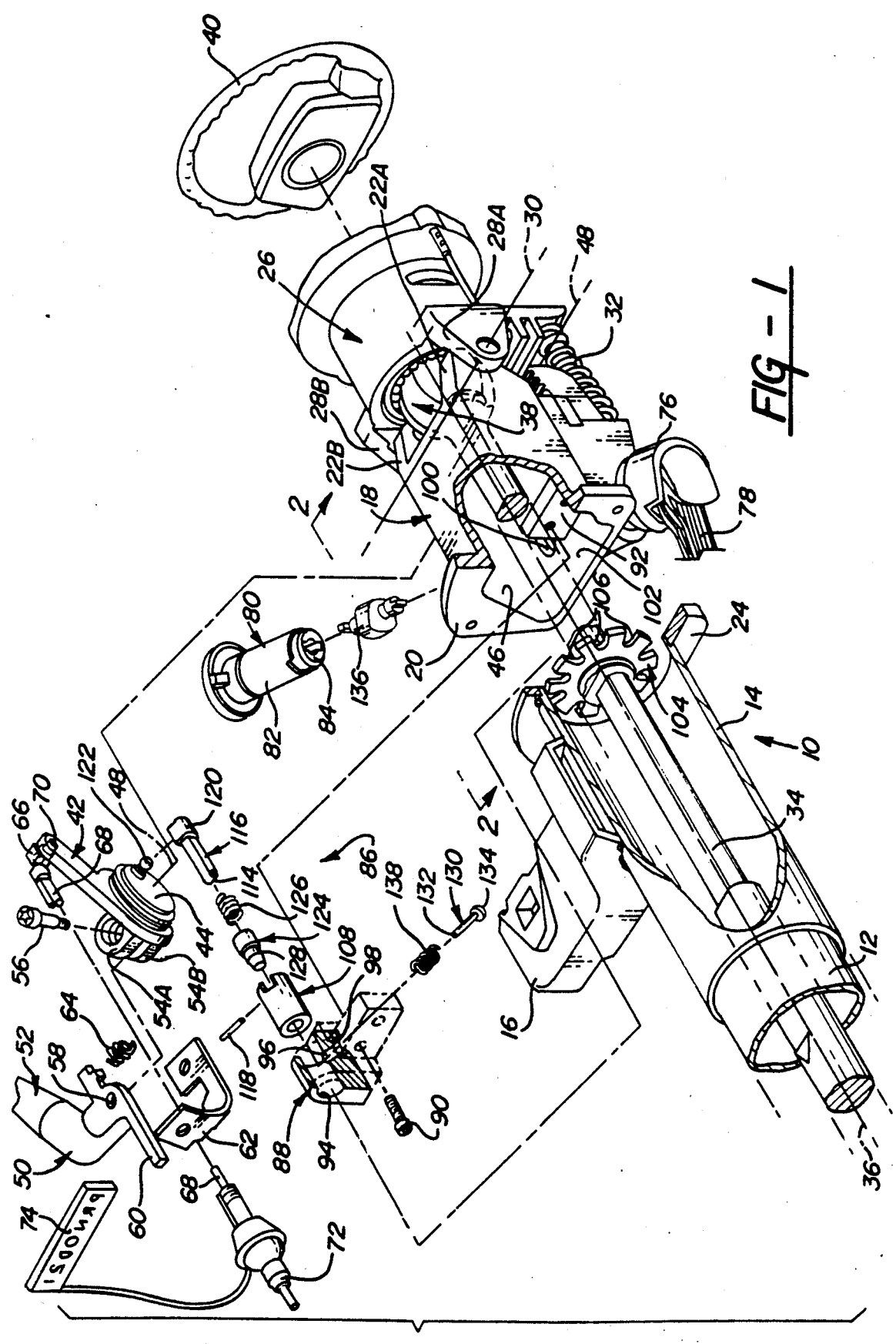
FIG. 1 is a partially broken-away, exploded perspective view of an anti-theft steering shaft lock according to this invention on an automobile steering column.

Referring to FIG. 1, an automotive steering column 10 includes a tubular lower mast jacket 12 and a tubular upper mast jacket 14 telescoped over the lower mast jacket. The lower end, not shown, of the lower mast jacket is conventionally anchored at the front of an automobile passenger compartment, not shown. An instrument panel bracket 16 is connected to the upper mast jacket 14 and is adapted for attachment to a structural part, not shown, of the automobile. The bracket 16 and the lower mast jacket anchor cooperate in mounting the steering column 10 on the automobile in the usual fashion.

A tubular intermediate housing 18 has a flange 20 at one end and a pair of mounting lugs 22A–B at the other end. The flange 20 abuts a similar flange 24 on the upper end of the upper mast jacket and bolts, not shown, between the flanges rigidly connect the intermediate housing to the upper mast jacket. A tilt housing 26 of the steering column 10 has a pair of lugs 28A–B at one end connected to respective ones of the lugs 22A–B on the intermediate housing such that the tilt housing is tiltable up and down about a first transverse axis 30 of the steering column. A spring 32 biases the tilt housing toward a maximum-up position.

A first steering shaft 34 is supported in the upper and lower mast jackets 12,14 for rotation about a longitudinal centerline 36 of the steering column. A second steering shaft, not shown, is rotatably supported in the tilt housing 26 and connected to the first steering shaft through a universal joint 38 in the intermediate housing 18. A steering wheel 40 is attached to an end of the second steering shaft projecting outside the tilt housing 26. The universal joint 38 unites the first and second steering shafts for unitary rotation at all angles of the tilt housing 26 relative to the intermediate housing 18.

A bellcrank 42 has a cylindrical trunnion 44 thereon which fits in a corresponding aperture, not shown, in a side 46 of the intermediate housing 18 whereby the bellcrank is supported on the intermediate housing for rotation about a second transverse axis 48 parallel to the first transverse axis 30. An end fitting 50 rigidly connected to a shift lever 52 fits between a pair of mounting lugs 54A–B on the bellcrank. A pin 56 fits through holes in the mounting lugs 54A–B and through a hole 58 in the end fitting to connect the end fitting and the shift lever 52 to the bellcrank for rotation as a unit therewith about the second transverse axis 48 and for pivotal movement relative thereto about the centerline of the pin 56. An arm 60 on the end fitting 50 cooperates with a stationary gate 62 in capturing the angular position of the shift lever around the second transverse axis 48. A spring 64 biases the arm 60 toward the gate 62.

An inboard end 66 of a transmission range selector cable 68 is attached to the end of the bellcrank 42 by a swivel pin 70 on the bellcrank. The cable 68 is slidable in a sheath 72 attached at opposite ends to fixed structure, not shown, of the automobile. The outboard end, not shown, of the cable 68 is attached to a transmission of the automobile. The shift lever is pivotable about the second transverse axis through a plurality of discrete angular positions corresponding to the ranges of the transmission and including a position, designated PARK, at one end of its angular travel corresponding to the range the transmission is in when the vehicle is parked and locked. A range indicator 74 is connected to the cable 68 and displays the operating range of the transmission.

An ignition switch 76 is disposed on the intermediate housing and connected by a wiring harness 78 to the electrical system, not shown, of the automobile. An ignition lock 80 is also disposed on the intermediate housing and includes an armored sleeve 82 anchored to the intermediate housing and a lock cylinder 84 rotatable in the sleeve upon insertion of an appropriately coded ignition key, not shown. As described below, the lock cylinder 84 is connected to the ignition switch 76 and to an anti-theft steering shaft lock 86 according to this invention.

The anti-theft steering shaft lock 86 includes a guide housing 88 rigidly attached by a plurality of bolts 90 to a shoulder 92 of the intermediate housing 18. The guide housing 88 has a bore 94 therein parallel to the first steering shaft 34 and a stepped bore 96 intersecting the bore 94 at an angle to the latter. The stepped bore has an annular shoulder 98 between big and small diameter portions thereof and is aligned with an aperture 100, FIG. 1, in a wall 102 of the intermediate housing separating the first steering shaft 34 from the ignition switch 76 and the ignition lock 80. The bore 94 in the guide housing 88 is perpendicular to the plane of a keeper 104 rotatable as a unit with the first steering shaft. Individual ones of a plurality of slots 106 in the keeper 104 register with the bore 94 in the guide housing when the first steering shaft 34 rotates about the centerline 36.

A guide 108 is slidably disposed in the bore 94 in the guide housing 88 and has a stepped bore 110 therein with a shoulder 112 between the big and small diameter portions of the bore. A first end 114 of a connecting rod 116 is pivotally attached to the guide 108 by a pin 118 extending through aligned holes in the guide and in the end of the connecting rod. A second end 120 of the connecting rod is attached to a swivel pin 122 on the trunnion 44 such that unitary rotation of the bellcrank 42 and shift lever 52 about the second transverse axis 48 is accompanied by sliding movement of the guide 108 in the bore 94. When the shift lever 52 is in its PARK position, the guide is in an extended position, FIG. 2c, near the keeper 104. When the shift lever is in any of its other positions, the guide 108 is in a corresponding one of a plurality of retracted positions, FIGS. 2a–2b, further removed from the keeper.

A dead bolt 124 is slidably disposed in the stepped bore 110 in the guide 108. A spring 126 between the dead bolt and the pin 118 on the guide biases the dead bolt to an extended position, FIGS. 2a and 2c, relative to the guide defined by engagement of a shoulder 128, FIG. 1, on the dead bolt on the shoulder 112 of the stepped bore 110. In the extended position of the guide 108 and the extended position of the dead bolt 124 relative to the guide, FIG. 2c, the dead bolt projects beyond the end of the guide 108 into the one of the slots 106 in the keeper 104 in register with the bore 94 whereby the dead bolt immobilizes the first and second steering shafts In any of the retracted positions of the guide 108, the dead bolt 124 is withdrawn from the slots 106 in the keeper 104 so that the first and second steering shafts are freely rotatable for steering the automobile.

A blocker 130 is slidably disposed in the small diameter portion of the stepped bore 96 in the guide housing 88 and includes a flat end 132 near the bore 94 in the guide housing and a spherical head 134 opposite the flat end. The blocker extends through the aperture 100 in the partition 102 and the spherical head 134 bears against a cam 136 connected to the lock cylinder 84 and to a rotor, not shown, in the ignition switch 76. The lock cylinder, the cam, and the ignition switch rotor rotate as a unit. A spring 138 between the spherical head 134 of the blocker and the shoulder 98 of the stepped bore 96 in the guide housing biases the spherical head against the cam 136. The blocker has a blocking position, FIGS. 2b–2c, wherein the flat end projects into the bore 94 in the guide housing and a non-blocking position, FIG. 2a, wherein the flat end is withdrawn into the small diameter portion of the stepped bore 96 in the guide housing The anti-theft steering shaft lock 86 according to this invention operates as follows. When the automobile is being driven, the lock cylinder 84 is in an active or on position and the shift lever 52 is in a position other than PARK. In that circumstance, FIG. 2a, the spring 138 biases the blocker to its non-blocking position and the connecting rod 116 locates the guide 108 in one of its retracted positions. At the same time, the spring 126 biases the dead bolt to its extended position relative to the guide 108. The dead bolt is separated from the keeper 104 and the first and second steering shafts are freely rotatable for steering the automobile in the usual way.

After the automobile is parked, the driver moves the shift lever to PARK. Concurrently, the connecting rod 116 moves the guide 108 to its extended position, FIGS. 2b–2c. The spring 126 holds the dead bolt 124 in its extended position relative to the guide. If one of the slots 106 in the keeper is in registry with the bore 94 in the guide housing 88, FIG. 2c, the dead bolt penetrates the slot and immobilizes the steering shafts. If no slot registers with the bore 94, the dead bolt 124 butts against the keeper 104, FIG. 2b, and the spring 126 compresses further between the dead bolt and the pin 118 as the guide moves to its extended position. Thereafter, the spring 126 automatically projects the dead bolt 124 into an adjacent slot 106 if the steering shafts are rotated slightly.

After the shift lever achieves PARK position, the driver turns the ignition key to a locked position from which it can be withdrawn from the lock cylinder in the usual way. Concurrently, the cam 136 projects the blocker from its non-blocking position to its blocking position wherein the flat end 132 projects into the bore 94 in the guide housing behind the guide 108. In the blocking position, the blocker secures the immobility of the steering shafts by preventing the shift lever from moving the guide 108 to any of its retracted positions.

Residual torque on the steering shafts such as if the front wheels are against a curb, forces a side of the slot 106 into which the dead bolt 124 projects against the side of the dead bolt. Friction between the side of the slot and the dead bolt increases the force required to withdraw the dead bolt. Regardless, only nominal force is required to turn the ignition key when it is desired to thereafter start the engine and drive the automobile. That is, the ignition key is reinserted in the lock cylinder and turned to a start position. The cam 136 permits the spring 138 to shift the blocker 130 from its blocking position to its non-blocking position. Because the blocker is independent of the dead bolt, only nominal effort is required to turn the key.

After engine is started, the driver grasps the shift lever and moves it from PARK to another position. Concurrently, the connecting rod 116 pulls the guide from its extended position to one of its retraced positions. The mechanical advantage created by the length of the shift lever relative to the second transverse axis 48 as compared to the radial distance of the swivel pin 122 from the second transverse axis allows the driver to substantially effortlessly overcome the residual torque induced friction between the dead bolt 124 and the keeper 104.

I claim:

1. In an automotive vehicle, the combination comprising:
a transmission control lever supported on said vehicle for pivotal movement from a PARK position when said vehicle is parked and locked to a plurality of operating positions,
a steering column having a longitudinal centerline and a steering shaft supported thereon for rotation about said longitudinal centerline,
a keeper rotatable as a unit with said steering shaft and having a slot therein,
a dead bolt,
means supporting said dead bolt on said steering column for movement between an extended position projecting into said keeper slot and immobilizing said steering shaft and a retracted position removed from said keeper slot,
connecting means between said dead bolt and said shift lever operative to move said dead bolt from said extended position to said retracted position concurrently with movement of said shift lever from said PARK position to one of said operating positions,
an ignition lock on said steering column having a lock cylinder rotatable by an ignition key between a locked position and a plurality of unlocked positions,
a blocker on said steering column movable between a blocking position preventing movement of said dead bolt from said extended position to said retracted position and an non-blocking position permitting movement of said dead bolt from said extended position to said retracted position, and
means connecting said blocker to said ignition lock cylinder operative to move said blocker between said blocking and said non-blocking positions concurrently with rotation of said ignition lock cylinder between said locked and unlocked positions thereof.

2. The combination recited in claim 1 wherein:
said shift lever is supported on said steering column for pivotal movement about a pivot axis of said steering column.

3. The combination recited in claim 2 wherein:
said pivot axis of said steering column is a transverse axis perpendicular to said longitudinal centerline of said steering column.

4. The combination recited in claim 3 wherein:
said keeper is an annular plate connected to said steering shaft for rotation as a unit therewith and disposed in a plane perpendicular to said longitudinal centerline of said steering column, and
said means supporting said dead bolt on said steering column for movement between said extended and said retracted positions includes
a guide housing on said steering column having a bore therein parallel to said longitudinal centerline of said steering column,
a guide in said guide housing bore movable between an extended position and a retracted position and having a stepped bore therein slidably receiving said dead bolt,
a shoulder of said stepped bore in said guide engaging a shoulder on said dead bolt to limit movement of said dead bolt relative to said guide, and
a spring between said guide and said dead bolt biasing said shoulder of said dead bolt against said shoulder of said stepped bore so that said dead bolt is movable as a unit with said guide between said extended and retracted positions of said guide corresponding to said extended and retracted positions of said dead bolt and yieldable when said dead bolt encounters an obstruction before said guide achieves said extended position thereof.

5. The combination recited in claim 4 wherein:
said connecting means between said dead bolt and said shift lever includes
a bellcrank supported on said steering column for rotation about said transverse pivot axis,
means connecting said shift lever to said bellcrank for rotation as a unit with said bellcrank about said transverse pivot axis, and
a connecting rod having a first end pivotally attached to said bellcrank at a predetermined radial distance from said transverse pivot axis and a second end pivotally attached to said guide.

6. The combination recited in claim 5 wherein:
said blocker is an elongated member slidably disposed on said guide housing including a first end having a head thereon and a second end projecting into said guide housing bore in said blocking position of said blocker to prevent movement of said guide from said extended to said retracted position thereof and removed from said guide housing bore in said non-blocking position of said blocker to permit movement of said guide from said extended to said retracted position thereof, and
said means connecting said blocker to said ignition lock cylinder includes
a cam rotatable as a unit with said ignition lock cylinder, and
spring means biasing said head at said first end of said blocker against said cam.

* * * * *